(12) United States Patent
Brockett et al.

(10) Patent No.: US 7,552,046 B2
(45) Date of Patent: *Jun. 23, 2009

(54) UNSUPERVISED LEARNING OF PARAPHRASE/TRANSLATION ALTERNATIONS AND SELECTIVE APPLICATION THEREOF

(75) Inventors: Christopher Brockett, Bellevue, WA (US); Eric Breck, Ithaca, NY (US); William Dolan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 769 days.

This patent is subject to a terminal disclaimer.

(21) Appl. No.: 10/988,721

(22) Filed: Nov. 15, 2004

(65) Prior Publication Data

US 2006/0106592 A1   May 18, 2006

(51) Int. Cl.
G06F 17/27 (2006.01)
G06F 17/20 (2006.01)
G06F 17/28 (2006.01)

(52) U.S. Cl. .................. 704/9; 704/1; 704/2; 704/3; 704/4

(58) Field of Classification Search .......... 704/9, 704/1, 2, 3, 4
See application file for complete search history.

(56) References Cited

U.S. PATENT DOCUMENTS

| | | | |
|---|---|---|---|
| 5,386,556 A * | 1/1995 | Hedin et al. ............. | 707/4 |
| 5,495,413 A | 2/1996 | Kutsumi et al. .......... | 704/4 |
| 6,098,033 A * | 8/2000 | Richardson et al. ...... | 704/1 |
| 6,188,976 B1 * | 2/2001 | Ramaswamy et al. ..... | 704/9 |
| 6,618,697 B1 | 9/2003 | Kantrowitz et al. ...... | 703/22 |
| 6,871,174 B1 | 3/2005 | Dolan et al. ............ | 704/9 |
| 7,013,264 B2 | 3/2006 | Dolan et al. ............ | 704/9 |
| 7,043,420 B2 | 5/2006 | Ratnaparkhi ............ | 704/9 |
| 7,050,964 B2 | 5/2006 | Menzes et al. .......... | 704/2 |
| 7,136,808 B2 | 11/2006 | Jessee et al. ........... | 704/10 |
| 7,146,308 B2 | 12/2006 | Lin et al. .............. | 704/9 |
| 7,412,385 B2 | 8/2008 | Brockett et al. ......... | 704/245 |
| 2002/0086268 A1 | 7/2002 | Shpiro ................. | 434/156 |
| 2002/0116173 A1 * | 8/2002 | Ratnaparkhi ............ | 704/9 |
| 2003/0033279 A1 | 2/2003 | Gibson et al. .......... | 707/1 |
| 2003/0055625 A1 * | 3/2003 | Korelsky et al. ........ | 704/9 |
| 2004/0181410 A1 * | 9/2004 | Hwang ................. | 704/256 |
| 2005/0049851 A1 | 3/2005 | Watanabe et al. ....... | 704/2 |
| 2006/0015324 A1 * | 1/2006 | Pan et al. .............. | 704/9 |
| 2006/0053001 A1 | 3/2006 | Brockett et al. ......... | 704/9 |
| 2007/0073532 A1 | 3/2007 | Brockett et al. ......... | 704/9 |

FOREIGN PATENT DOCUMENTS

EP    1531402 A2    5/2005

OTHER PUBLICATIONS

Goldman, N. M. 1975. Sentence paraphrasing from a conceptual base. Commun. ACM 18, 2 (Feb. 1975), 96-106.*

(Continued)

Primary Examiner—Talivaldis Ivars Smits
Assistant Examiner—Michael Ortiz Sanchez
(74) Attorney, Agent, or Firm—Westman, Champlin & Kelly, P.A.

(57) ABSTRACT

A computer-implemented method determines whether to apply a given paraphrase alternation pattern to an input string. The method includes generating a context model and applying the context model to determine whether the given paraphrase alternation pattern can be applied to the input string so as to preserve meaning.

15 Claims, 3 Drawing Sheets

OTHER PUBLICATIONS

Riesbeck, C. K., Schank, R. C., Goldman, N. M., and Rieger, C. J. 1975. Inference and Paraphrase by Computer. J. ACM 22, 3 (Jul. 1975).*

Azarhid F.; Isabelle J.; O'Shaughenessy D., "Clustering for Statistical Language Models Based on Contextual Word Similarity," INRS-Télécommunications, IEEE, pp. 180-183, 1996.*

Iyer, R.; Ostendorf, M.; Gish, H., "Using out-of-domain data to improve in-domain language models," Signal Processing Letters, IEEE, vol. 4, No. 8, pp. 221-223, Aug. 1997.*

Related U.S. Appl. No. 10/706,102, filed Nov. 12, 2003. (Our file : M61.12-0549).

C. Quirk et al.; "Dependency Treelet Translation: Syntactically Informed Phrasal SMT," *Proceedings of the 43rd Annual Meeting of the ACL*, Association for Computer Linguistics, Ann Arbor, Jun. 2005, pp. 271-279.

Ringger & Allen, Eric K. & James F.; "A Fertility Channel Model for Post-Correction of Continuous Speech Recognition," Proc. of the 4th International Conference on Spoken Language Processing (ICSLP'96), Philadelphia, PA. Oct. 1996, pp. 1-4.

Kang, B.J. & Choi, K.S.; "Automatic Transliteration and Back-Transliteration by Decision Tree Learning," Proceedings of 2nd International Conference on Language Resources and Evaluation, Athens, Greece May-Jun. 2000, pp. 1135-1141.

K.S. Jeong et al.; "Automatic Identification and Back-Transliteration of Foreign Words for Information Retrieval," *Information Processing and Management*: An International Journal, Oxford, NY, Pergamon Press. 1999, pp. 523-540.

Knight, K. & Graehl, J.; "Machine Transliteration," Proc. of the 35th Annual Meeting of the Association for Computational Linguistics, 1997. pp. 128-135.

Wang, Y.Y. & Waibel, A.; "Decoding Algorithm in Statistical Machine Translation," Proc. of 35th Annual Meeting of the Association of Computational Linguistics, 1997, 7 pgs.

Al-Onaizan, Y. & Knight, K.; "Machine Transliteration of Names in Arabic Text," Proc. Of ACL Workshop on Computational Approaches to Semitic Languages, 2002, 12 pages.

Brill, E.; Kacmarcik, G.; & Brockett, C.; "Automatically Harvesting *Katakana*-English Term Pairs from Search Engine Query Logs," NLPRS 2001 : pp. 393-399.

Kang, B.J. & Choi.; "English-Korean Automatic Transliteration/Back-transliteration System and Character Alignment," The 38th Annual Meeting of the Association for Computational Linguistics, Oct. 2000, 2 pgs.

Virga, P. & Khudanpur, S.; "Transliteration of Proper Names in Cross-Lingual Information Retrieval," Proc. Of the ACL Workshop on Multilingual Named Entity Recognition, 2003, 8 pgs.

Al-Onaizan, Y. & Knight, K.; "Translating Named Entities Using Monolingual and Bilingual Resources," Proc. Of the 40th Annual Meeting of the Assoc. for Computational Linguistics, Philadelphia, PA, Jul. 2002, pp. 400-408.

Glover-Stalls, B. & Knight, K.; "Translating Names and Technical Terms in Arabic Text," Proceedings of the Coling/ACL Workshop on Computational Linguistics, 1998, 8 pgs.

Lin, D. and Pantel, P.; "DIRT—Discovery of Inference Rules from Text," In Proceedings of the ACM SIGKDD Conference on Knowledge Discovery and Data Mining, 2001, pp. 323-328.

Y. Shinyama et al.; "Automatic Paraphrase Acquisition from News Articles," Proceedings of Human Language Technology Conference, San Diego, USA, 2002. pp. 1-6.

Barzilay, R. and McKeown, K.; "Extracting Paraphrases from a Parallel Corpus," *Meeting of the Association for Computational Linguistics*, 2001, pp. 50-57.

Bo Pang et al.; "Syntax-Based Alignment of Multiple Translations: Extracting Paraphrases and Generating New Sentences," pp. 1-8.

A. Ibrahim. "Extracting Paraphrases from Aligned Corpora," MIT Research Paper, Sep. 2002, pp. 1-60.

Peter F. Brown et al.; "The Mathematics of Statistical Machine Translation: Parameter Estimation," Association for Computer Linguistics, 2003, pp. 263-311.

Bill Dolan et al.; Unsupervised Construction of Large Paraphrase Corpora: Exploiting Massively Parallel News Sources, Natural Language Processing Group, Microsoft Research, pp. 1-7.

D. Yarowsky. Word-Sense Disambiguation Using Statistical Models of Roget's Categories Trained on Large Corpora, Proceedings of Coling-92, Jul. 1992. pp. 454-460.

Chris Quirk et al.; "Monolingual Machine Translation for Paraphrase Generation," Natural Language Processing Group, Microsoft Research, pp. 1-8.

Gale, W. and Church, K.; "A Program for Aligning Sentences in Bilingual Corpora," AT & T Bell Laboratories, pp. 1-16.

Barzilay, R. and Lee, L.; "Learning to Paraphrase: An Unsupervised Approach Using Multiple-Sequence Aligment," Proceedings of HLT-NAACL 2003, pp. 16-23.

Goldman, N.M. 1975. Sentence paraphrasing from a conceptual base. Commun. ACM 18, 2 (Feb. 1975), 96-106.

Riesbeck et al., C.K. 1975. Inference and Paraphrase by Computer. J. AMC 22, 3 (Jul. 1975).

Azarhid et al., F.; "Clustering for Statistical Language Models Based on Contextual Word Similarity," INRS-Telecommunications, IEEE, pp. 180-183, 1996.

Japanese Pat. Appln. # 2004-316990 First Official Action of Rejection, Oct. 2007.

Iyer et al., R.; "Using out-of-domain data to improve in-domain language models," Signal Processing Letters, IEEE, vol. 4, No. 8, 221-223, Aug. 1997.

Hayes-Roth, F.; Mostow, D. "Syntax and Semantics in a distributed speech understanding system," Acoustics, Speech and Signal Processing, IEEE International Conference on ICASSP '76, vol. 1, No., pp. 421-424, Apr. 1976.

Hayes-Roth & Mostow, F. and D.; "Syntax and Semantics in a Distributed Speech Understanding System," IEEE—Downloaded Oct. 24, 2008—Computer Science Dept. Carnegie-Mellon University, pp. 421-424.

Onifer, W., & Swinney, D. (1981). Accessing lexical ambiguities during sentence comprehension: Effects of frequency, meaning and contextual bias. Memory & Cognition, 9, 225-236.

* cited by examiner

UNSUPERVISED LEARNING OF PARAPHRASE/TRANSLATION ALTERNATIONS AND SELECTIVE APPLICATION THEREOF

CROSS-REFERENCE TO RELATED APPLICATIONS

The present application is related to co-pending application Ser. No. 10/989,125, filed Nov. 15, 2004, and co-pending application Ser. No. 10/989,076, filed Nov. 15, 2004, the contents of which are hereby incorporated by reference in their entireties.

BACKGROUND OF THE INVENTION

The present invention deals with knowledge-poor sub-sentential paraphrasing. More specifically, the present invention deals with methods for learning meaning-preserving text segment alternations from word-aligned, parallel text (either monolingual or bilingual). The present invention also deals with selectively applying such alternations without introducing ambiguity and/or changing meaning.

The recognition and generation of paraphrases is a key problem for many applications of Natural Language Processing (NLP) systems. Being able to identify that two different pieces of text are equivalent in meaning enables a system to behave much more intelligently. A fundamental goal of work in this area is to produce a program that will be able to re-state a text segment in a manner that preserves its semantic content while manipulating features like vocabulary, word order, reading level, and degree of conciseness or verbosity.

One exemplary application which can benefit from paraphrase identification and generation includes a question answering system. For example, consider a question "When did the Governor of California arrive in Sacramento?". It is very likely that a large data corpus, such as a global computer network (or a news reporting system that publishes articles on a global computer network) may already contain text that answers the question. In fact, such a corpus may already contain text that answers the question and is phrased in exactly the same terms as the question. Therefore, a conventional search engine may have no difficulty in finding text that matches the question, and thus returning an adequate result.

The same problem becomes more difficult when searching a smaller data corpus, such as one found on an intranet. In that case, even though the small data corpus may contain text that answers the question, the answer may be phrased in different terms than the question. By way of example, the following sentence answers the question set out above, but is phrased in different terms from the question:

The California Governor landed in Sacramento on Sep. 20, 2004.

Since this answer is phrased differently than the question, a conventional search engine may encounter difficulty in returning a good result, given only the described textual answer in the corpus that it is searching.

Prior systems for addressing the problem of recognition and generation of paraphrases include large hand-coded efforts that attempt to address the problem in limited contexts. For example, large hand-coded systems attempt to map between a wide variety of different ways of saying the same thing and a form acceptable to a command and control system. Of course, this is extremely difficult because the author of the code likely cannot think of every different way a user might phrase something. Therefore, the focus in the research community has shifted from manual efforts to automatic methods of paraphrase identification and generation.

Recent work on systems aimed at automatically identifying textual paraphrase relations includes D. Lin and P. Pantel, *DIRT-DISCOVERY OF INFERENCE RULES FROM TEXT*, Proceedings of ACMSIGKDD Conference on Knowledge Discovery and Data Mining, pages 323-328 (2001). The DIRT article examines the distributional properties of dependency paths linking identical "anchor points" (i.e. identical or similar words) in a parsed corpus of newswire data. None of the special properties of news data are exploited since the parsed corpus is simply viewed as a large source of monolingual data. The basic idea is that high frequency dependency graph paths which link identical or similar words are themselves likely to be similar in meaning. When run over a gigabyte of newspaper data, the system identified patterns such as:

X is resolved by Y.
X resolves Y.
X finds a solution to Y.
X tries to solve Y.

The DIRT system has been limited to a very restricted sort of "triple" relation, such as "X verb Y".

Another article that deals with paraphrase identification is Y. Shinyama, S. Sekine, K. Sudo and R. Grisham, *AUTOMATIC PARAPHRASE ACQUISITION FROM NEWS ARTICLES*, Proceedings of Human Language Technology Conference, San Diego, Calif. (HLT 2002). In the Shinyama et al. article, the observation is made that articles from different newspapers that describe the same event often exemplify paraphrase relations. The paper describes a technique that relies on the assumption that named entities (such as people, places, dates and addresses) remain constant across different newspaper articles on the same topic or on the same day. Articles are clustered using an existing information retrieval system into, for example, "murder" or "personnel" groupings or clusters. Named entities are annotated using a statistical tagger, and the data is then subjected to morphological and syntactic analysis to produce syntactic dependency trees. Within each cluster, sentences are clustered based on the named entities they contain. For instance, the following sentences are clustered because they share the same four named entities:

Vice President Osamu Kuroda of Nihon Yamamuri Glass Corp. was promoted to President.

Nihon Yamamuri Glass Corp. decided the promotion of Vice President Osamu Kuroda to President on Monday.

Given the overlap in named entities, these sentences are assumed to be linked by a paraphrase relationship. Shinyama et al. then attempt to identify patterns that link these sentences using existing machinery from the field of information extraction.

Shinyama et al. also attempt to learn very simple phrase level patterns, but the technique is limited by its reliance on named entity anchor points. Without these easily identified anchors, Shinyama et al. can learn nothing from a pair of sentences. The patterns that Shinyama et al. learn all center on the relationship between a particular type of entity and some type of event within a particular domain. The results are fairly poor, particularly when the training sentences contain very few named entities.

Another article also deals with paraphrases. In Barzilay R. and L. Lee, *LEARNING TO PARAPHRASE: AN UNSUPERVISED APPROACH USING MULTIPLE-SEQUENCE ALIGNMENT*, Proceedings of HLT/NAACL: (2003), Edmonton, Canada, topic detection software is used to cluster thematically similar newspaper articles from a single source, and from several years worth of data. More specifically, Barzilay et al. attempts to identify articles describing terrorist incidents. They then cluster sentences from these articles in order to find sentences that share a basic overall form or that share multiple key words. These clusters are used as the basis for building templatic models of sentences that allow for certain substitutional elements. In short, Barzilay et al. focuses on finding similar descriptions of different events, even events which may have occurred years apart. This focus on grouping sentences by form means that this technique will not find some of the more interesting paraphrases.

Also Barzilay and Lee require a strong word order similarity in order to class two sentences as similar. For instance, they may not class even active/passive variants of an event description as related. The templatic paraphrase relationships learned by Barzilay et al. are derived from sets of sentences that share an overall fixed word order. The paraphrases learned by the system amount to regions of flexibility within this larger fixed structure. It should also be noted that Barzilay and Lee appear to be alone in the literature in proposing a generation scheme. The other work discussed in this section is aimed only at recognizing paraphrases.

Another paper, Barzilay and McKeown *Extracting Paraphrases From a Parallel Corpus*, Proceedings of ACL/EACL (2001), relies on multiple translations of a single source document. However, Barzilay and McKeown specifically distinguish their work from machine translation techniques. They state that without a complete match between words in related sentences, one is prevented from using "methods developed in the MT community based on clean parallel corpora." Thus, Barzilay and McKeown reject the idea that standard machine translation techniques could be applied to the task of learning monolingual paraphrases.

Another prior art system also deals with paraphrases. This system relies on multiple translations of a single source to build finite state representations of paraphrase relationships. B. Pang, K. Knight, and D. Marcu, *SYNTAX BASED ALIGNMENT OF MULTIPLE TRANSLATION: EXTRACTING PARAPHRASES AND GENERATING NEW SENTENCES*, Proceedings of NAACL-HLT, 2003.

Still another prior reference also deals with paraphrase recognition. Ibrahim, Ali, *EXTRACTING PARAPHRASES FROM ALIGNED CORPORA*, Master Thesis, MIT (2002). In his thesis, Ibrahim indicates that sentences are "aligned" or subjected to "alignment" and that paraphrases are identified. However, the term "alignment" as used in the thesis means sentence alignment instead of word or phrase alignment and does not refer to the conventional word and phrase alignment performed in machine translation systems. Instead, the alignment discussed in the thesis is based on the following paper, which attempts to align sentences in one language to their corresponding translations in another:

Gale, William, A. and Church, Kenneth W., *A PROGRAM FOR ALIGNING SENTENCES IN BILINGUAL CORPORA*, Proceedings of the Associations for Computational Linguistics, Pages 177-184 (1991). Ibrahim uses this algorithm to align sentences within multiple English translations of, for example, Jules Verne novels. However, sentence structure can vary dramatically from translation to translation. What one translator represents as a single long sentence, another might map to two shorter ones. This means that the overall number of sentences in the different translations of a single novel do not match, and some sort of automated sentence alignment procedure is needed to identify equivalent sentences. The overall technique Ibrahim uses for extracting paraphrases from these aligned monolingual sentences is derived from the multiple-translation concepts set forth in the Barzilay, McKeown reference, plus a variation on the DIRT framework described by Lin et al.

SUMMARY OF THE INVENTION

Embodiments of the present invention pertain to a computer-implemented method for determining whether to apply a given paraphrase alternation pattern to an input string. The method includes generating a context model and applying the context model to determine whether the given paraphrase alternation pattern can be applied to the input string so as to preserve meaning.

DETAILED DESCRIPTION OF ILLUSTRATIVE EMBODIMENTS

The present invention deals with methods for learning meaning-preserving text segment alternations from word-aligned, parallel text (either monolingual or bilingual). It should be noted that the term "text segment," as it is used herein, is intended to refer to any contiguous chunk of text, from an entire document down to a single word. The present invention also deals with selectively applying such alternations so as to preserve meaning and/or avoid ambiguity. However, prior to discussing the present invention in greater detail, one illustrative environment in which the present invention can be used will be discussed.

Figure 1:
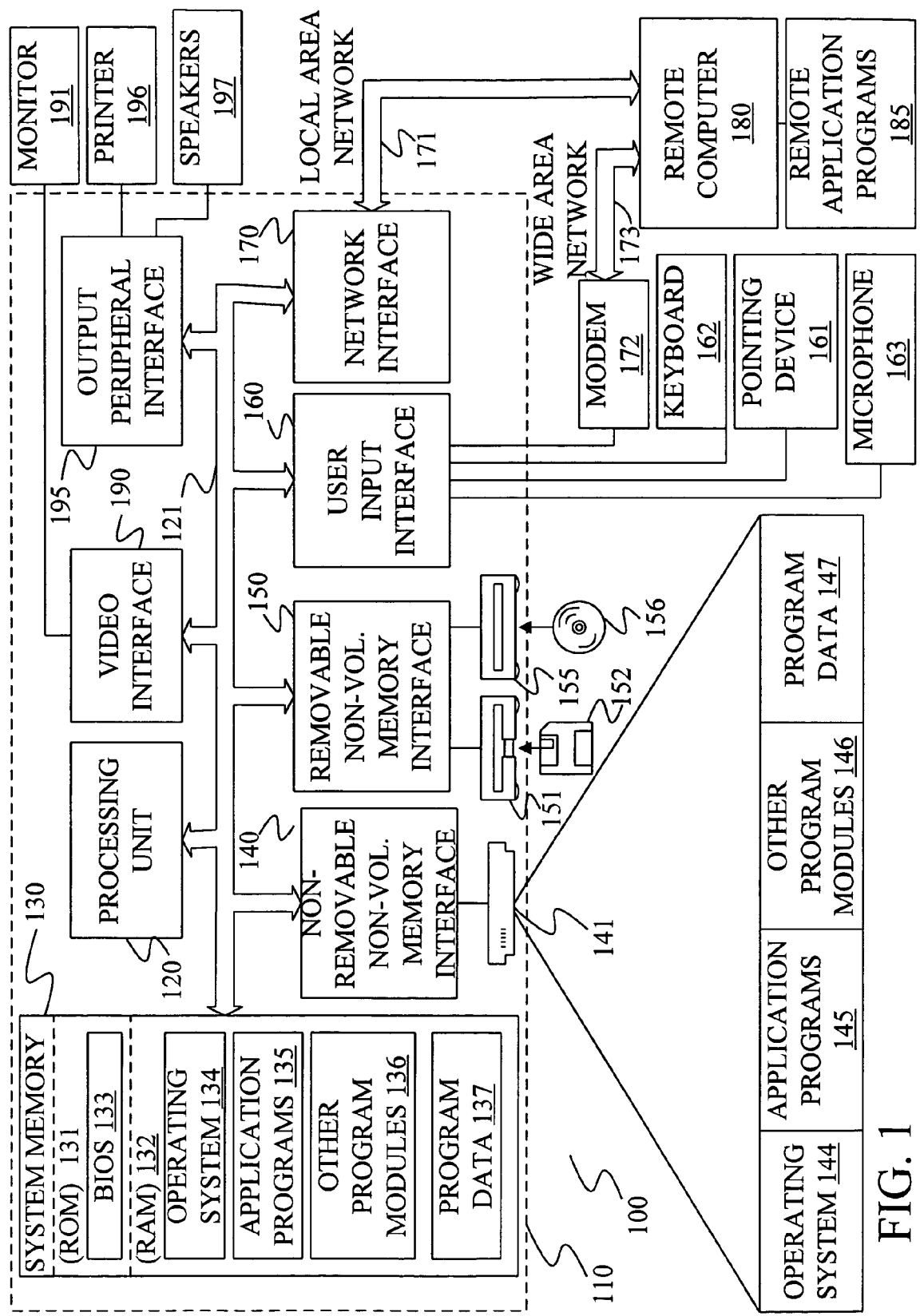
FIG. 1 is a block diagram of one embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both locale and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
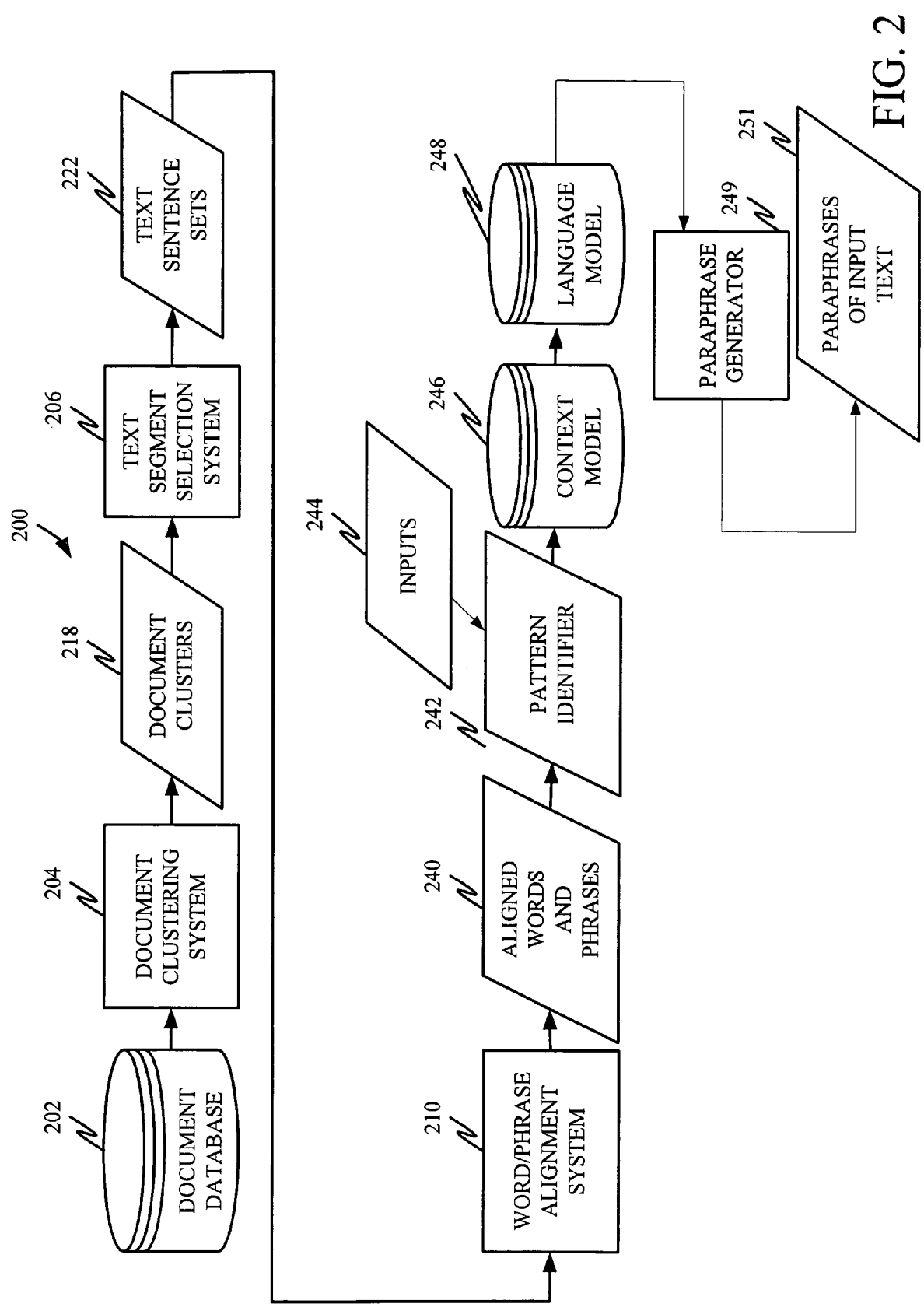
FIG. 2 is a block diagram of a paraphrase recognition and generation system in accordance with one embodiment of the present invention.
Figure 3:
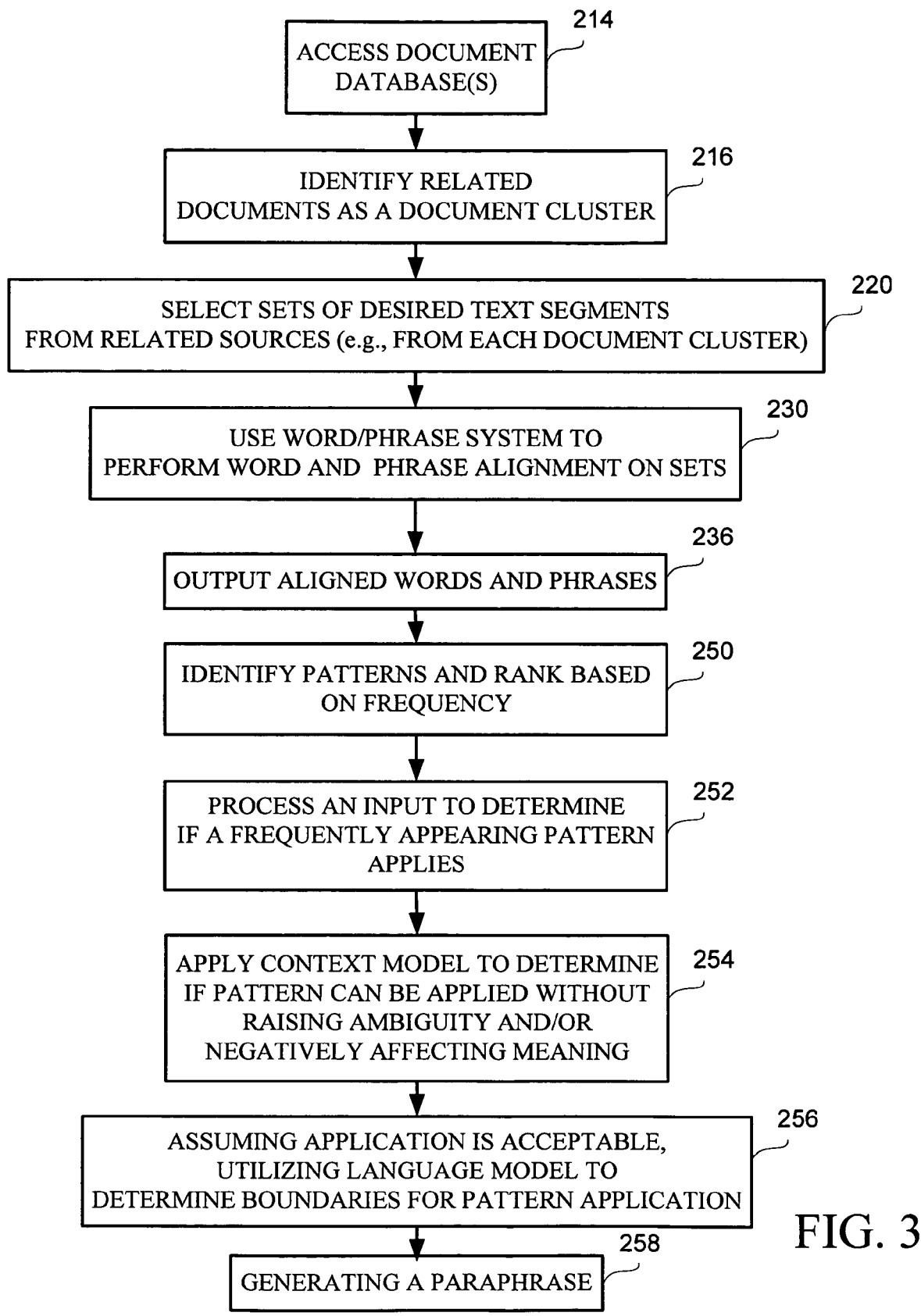
FIG. 3 is a flow chart illustrating the operation of the system shown in FIG. 2.

FIG. 2 is a block diagram of one embodiment of a paraphrase processing system 200. System 200 has access to a document database 202 and includes a document clustering system 204, text segment selection system 206, word/phrase alignment system 210, pattern identifier 242, context model 246, language model 248 and paraphrase generator 249. FIG. 3 is a flow diagram illustrating the operation of system 200 in accordance with one aspect of the present invention.

Document database 202 illustratively includes a variety of different news articles written by a variety of different news agencies. Each of the articles illustratively includes a time stamp indicating approximately when the article was authored. Also, the plurality of articles from the different news agencies will illustratively be written about a wide variety of different events.

Of course, while the present invention is described with respect to news articles, other source documents could be used as well, such as technical articles describing a common process, different medical articles describing a common medical procedure, etc.

Document clustering system 204 accesses document database 202 as illustrated by block 214 in FIG. 3. It should also be noted that while a single database 202 is illustrated in FIG. 2, a plurality of databases could be accessed instead.

Clustering system 204 identifies articles in document database 202 that are written about the same event. In one embodiment, the articles are also identified as being written at approximately the same time (such as within a predetermined time threshold of one another, e.g., one month, one week, one day, within hours, etc. . . . as desired). The articles identified as being written about the same event (and perhaps at about the same time) form a document cluster 218. This is indicated by block 216 in FIG. 3.

Once related source articles are identified as a cluster 218, desired text segments (such as sentences, phrases, headlines, paragraphs, etc.) in those articles are extracted. For instance, a journalistic convention in news articles advises that the first 1-2 sentences of the article represent a summary of the rest of the article. Therefore, in accordance with one embodiment of the present invention, the articles (which were illustratively written by different news agencies) are clustered into clusters 218 and provided to text segment selection system 206 where the first two sentences of each article, in each cluster 218, are extracted. While the present discussion proceeds with respect to sentences, it will be noted that this is exemplary only and other text segments could just as easily be used. The sentences from each cluster 218 of articles are output as a sentence set 222 corresponding to the clustered articles. The sentence sets 222 are output by text segment selection system 206 to word/phrase alignment system 210. This is indicated by block 220 in FIG. 3.

In the specific example in which sentences are used, many of the sentences gathered in this way appear to be versions of some single original source sentence, slightly rewritten by editors at different news agencies for stylistic reasons. Frequently, these sets of sentences have been observed to differ only in small ways, such as the order of the clauses appearing in the sentence.

Text segment selection system 206 generates sets 222 of sentences for each cluster. It should be noted that the word/phrase alignment system 210 can operate on large sets of sentences by extracting mappings between words or phrases based on a holistic examination of the sentences in the set. However, the present discussion proceeds with respect to generating sentence pairs and performing alignment on those pairs, as but one illustrative embodiment. Thus, in one embodiment, the identified sets of sentences are formed into pairs of sentences. Therefore, text segment selection system 206 pairs each sentence in a set against every other sentence in that set to generate sentence pairs for each set. The sentence pairs are in one embodiment, subjected to an optional filtering step, and in another embodiment, are output directly to word/phrase alignment system 210. While the filtering will be described with respect to the present embodiment, it will be noted that the steps associated with filtering are optional.

In one illustrative embodiment, text segment selection system 206 implements a heuristic that filters the sentence pairs based on shared key content words. For example, in one illustrative embodiment, system 206 filters the sentence pairs, removing those sentence pairs that do not share at least three words of at least four characters each. Of course, filtering is optional, and, if used, the filtering algorithm implemented can vary widely. Any of a variety of different filtering techniques can be used, such as filtering on past results (which requires a feedback loop in the output of word/phrase alignment system 210 back to text segment selection system 206), filtering on different numbers of content words, filtering on other semantic or syntactic information, etc. In any case, the sets of sentences can be paired and can be filtered and provided to word/phrase alignment system 210.

In one embodiment, alignment system 210 develops alignment models and/or performs statistical word and/or phrase alignment on sentence sets 222. This is indicated by block 230 in FIG. 3. The output of aligned words and/or phrases is indicated by block 240 in FIG. 2 and step 236 in FIG. 3.

In one illustrative embodiment, the word/phrase alignment system 210 implements a conventional word/phrase alignment algorithm from the statistical machine translation literature in an attempt to learn lexical correspondences between the sentences in the sets 222. In one embodiment, some alignments will involve shifts of identical strings.

For example:
1. . . . A of B . . . (Governor of California)
1. . . . BA . . . (California Governor)
   NOTE: of="pivot"
   NOTE: Pattern is bi-directional
2. . . . A of the B . . . . (President of the United States)
2. . . . BA . . . (United States President)
   NOTE: of the="pivot phrase"
   NOTE: Pattern is bi-directional In another embodiment, alignments are not restricted to string-identical scenarios. For example:
1. . . . the American ambassador . . .
1. . . . the Ambassador of the United States . . .

Processing components known in the art can be leveraged to identify alignments where phrases or words are not identical but still mapped to one another. In one embodiment, known knowledge-poor word alignment techniques are implemented to align text segments that are likely to demonstrate similar or identical meanings.

In one embodiment, some alignments will involve alternations from passive voice phrasing to active voice phrasing. For example,
1. The ball was hit by the boy.

1. The boy hit the ball.

In accordance with one embodiment, alignments are mapped from one language to another utilizing processing tools common to statistical machine translation technology. In another embodiment, tools for facilitating alignment techniques are known within statistical machine translation technology and can be leveraged to accomplish alignment even within a single language.

A more specific explanation of how statistical machine translation technology can be leveraged for meaning-oriented alignment will now be discussed. It is standard practice in statistical machine translation to utilize a large corpus of paired sentences that are believed to demonstrate the same meaning in two languages. For example, a collection of human-translated data can be utilized to train a statistical machine translation system. A translation lexicon is learned from this data in order to capture translation patterns that have been identified using statistical techniques (e.g., this English word or phrase likely corresponds to this Japanese or Spanish word or phrase). These techniques permit the matching of character strings that are not identical at string level, but which appear in analogous contexts so frequently that it is likely that they mean the same thing (e.g., English "dog"=Spanish "perro"). Translation lexicon learning techniques can therefore be leveraged to support the identification of paraphrase alignments, such that different English text segments with same meanings will map to the same outcome even though the character strings are different.

In one illustrative embodiment, word/phrase alignment system 210 is implemented using techniques set out in P. F. Brown et al., *The Mathematics of Statistical Machine Translation: Parameter Estimation*, Computational Linguistics, 19:263-312, (June 1993). Of course, other machine translation or word/phrase alignment techniques can be used for identifying associations between words and the input text. Any similar system could be implemented for similar purposes without departing from the scope of the present invention. Other applicable techniques are described in Quirk, C., C. Brockett, and W. B. Dolan, *Monolingual Translation for Paraphrase Generation, In Proceedings of the 2004 Conference on Empirical Methods in Natural Language Processing*, 25-26 Jul. 2004, Barcelona Spain, pp. 142-149, as well as in Dolan W. B., C. Quirk, and C. Brockett, *Unsupervised Construction of Large Paraphrase Corpora: Exploiting Massively Parallel News Sources, Proceedings of COLING 2004*, Geneva, Switzerland.

Thus, parallel collections of text are extracted from clustered news stories. For example, the following pair of sentences are illustratively clustered together:
1. "Kerry challenged Bush to get out of the way"
2. "Kerry said President Bush stands in the way"

Some identified parallel sentences will provide relatively small-scale stylistic alternations, for example:
1. The medicine called factor eight . . .
1. The medicine—called factor viii . . .
2. They are getting a tad more colorful . . .
2. They are getting a tad more colourful . . .
3. President and Chief Operating Officer
3. President and COO . . .

Other collections reflect more complex meaning preserving syntactic alternations, such as:
1. . . . the plot to kidnap Victoria Beckham . . .
1. . . . the Victoria Beckham kidnap case . . .
2. . . . children's hospital at Montefiore . . .
2. . . . Montefiore children's hospital . . .
3 . . . . 17-year-old Max Guarino . . .
3. . . . Max Guarino, 17, . . .
4. . . . said in a statement today . . .
4. . . . said today in a statement . . .

In accordance with one aspect of the present invention, output 240 from component 210 is utilized as a basis for an unsupervised knowledge-poor process for identifying and learning textual alternations that are meaning-preserving. These alternations can then be utilized as a basis for identifying and generating meaning-preserving paraphrases in any of a variety of contexts and applications. In the process, in one embodiment, alternations that do not preserve meaning (e.g., "Washington University" does not mean the same as "University of Washington") can be identified, learned and utilized as a basis for avoiding inaccurate alternations.

It should be noted that the term "knowledge-poor" as it is utilized herein is generally intended to signify a lack of information about grammatical structure, linguistic structure, dictionary information, syntactic structure, synonym information, parts of speech information, background information (e.g., California is a state, Bush is the President, etc.) or other similar information. Generally speaking, the goal is to be applicable to support applications where access to extensive resources is not available, as may be the case when applying this method to languages other than English, and to provide a dynamic system that is not dependent upon a constant process of updating such resources. Accordingly, one aspect of the present invention pertains to a knowledge-poor process for analyzing alternation/transformation-rich data to deduce meaning-preserving paraphrase alternations. This being said, incorporation of information that are not consistent with knowledge-poor processing is also within the scope of the present invention.

In accordance with one aspect of the present invention, as is indicated by block 250 in FIG. 3, the next step in the process is to utilize pattern identifier 242 to analyze output 240 and identify potential paraphrase patterns. From each alignment, one or more alternation patterns are illustratively derived.

In one embodiment, some patterns will contain pivots (e.g., words or phrases) and others will not. For example:
1. AB=BA (No pivot)
    . . . said Rumsfield . . .
    . . . Rumsfield said . . .
    . . . was automatically shut down . . .
    . . . shut down automatically . . .
2. A, B=BA (With comma pivot)
    . . . Steve Jobs, Apple CEO . . .
    . . . Apple CEO Steve Jobs
    . . . In a statement, @ Stake said . . .
    . . . The @ Stake statement said . . .

Other potential patterns include but are certainly not limited to:
   A in B=BA
   A, B=B, A
   A were B=BA
   A's B=BA
   A's B=B of A
   A and B=B and A
   A the B and BA
   A was B=BA
   A on B=BA The alternation patterns shown above are given in English for illustrative purposes only. Persons skilled in the art will recognize that analogous alternation patterns can generally be identified in any other languages using the method described in this patent.

In accordance with one aspect of the present invention, as is indicated in block 250 of FIG. 3, the identified patterns are sorted based on frequency of occurrence. Patterns that occur in the data frequently receive a high ranking while patterns that do not occur frequently receive a low ranking. Accordingly, patterns having little value to subsequent paraphrase processing will sort themselves out to the bottom of the list while more valuable patterns will rise to the top. In accordance with one embodiment, a cut-off point is selected above which are patterns to be used for subsequent processing and below which are patterns to be discounted. Longer and more complex meaning-preserving patterns will eventually rise above the threshold as the quantity of data underlying the frequency-based list grows larger.

The described frequency sorting process is based on the assumption that high frequency alternation patterns are more likely to be meaning preserving. Thus, given a sufficient quantity of training data, a relatively low-frequency meaning-preserving alternation pattern such as the following is likely to eventually surface above the threshold:

1. A is the birthplace of B
1. B was born in A

On the other hand, an alternation such as the following is essentially accidental and will pull to the bottom of a frequency-based list.

1. U.S. President George Bush yesterday declared
1. Bob declared that U.S. President George Bush In accordance with block 252 in FIG. 3, the next step in the process is to process a textual input (244 in FIG. 2) to determine if the textual components thereof are applicable to any of the patterns above the threshold. Applicability of a pattern means there is a potential, but not a guarantee, for a meaning-preserving alternation. In one embodiment, before an alternation is proposed, a determination is made as to whether the potential alternation introduces ambiguity and/or alters meaning.

In accordance with one aspect of the present invention, block 254 represents applying a context model 246 (FIG. 2) to facilitate a determination as to whether an applicable pattern introduces ambiguity and/or alters meaning. For example:

1. owner of Mets=>Mets owner
   Pattern can apply
2. because of drought=>drought because
   Do not apply (meaning not preserved)
3. cup of coffee=>coffee cup
   Do not apply pattern (ambiguous result)
4. hair of the dog=>dog hair
   Do not apply (meaning not preserved)
5. tooth enamel=>enamel of tooth
   Do not apply (awkward result linguistically)

It should be pointed out that the patterns above the threshold line are already biased toward meaning-preserving changes. However, application of context model 246 assists in determining when to apply a pattern to real input data.

The process up to this point essentially guarantees that for each generated pattern above the threshold there exists corresponding parallel sentences that represent the source of the pattern. All of these sentences are positive examples of contexts wherein the pattern can be executed in a meaning-preserving manner. In accordance with one embodiment, application of the context model 246 in accordance with block 254 involves training a statistical classifier on the source sentences to assist in the identification of other contexts in which the pattern can be applied successfully (i.e., without introducing ambiguity and/or altering meaning). Accordingly, the context model is utilized as a basis for determining whether a given pattern that matches the input on the surface can be applied in a meaning-preserving manner.

Accordingly, in one aspect of the present invention, a context model is generated for each pattern above the threshold in order to identify specific contexts in which the pattern can be applied. The context model is derived based on the sets of information utilized as a basis for generating the pattern. Generally speaking, the context model is a generalization of basic patterns that define other circumstances under which the pattern can be applied in a meaning-preserving manner.

There are many specific bases for generation of a context model within the scope of the present invention. Any basis, whether complex or simple, that supports generation of a suitable predictive inference to be generated is within the scope of the present invention. Such an inference will be a generalized assumption that a contextual characteristic supported in the data underlying the pattern is reflected in the context of the input 244 so as to justify a conclusion that a similar alternation will also be meaning-preserving. In accordance with one aspect of the present invention, the basis of the context model application supports the overall goal of preserving "knowledge-poor" processing. This being said, bases for other context model applications that are not consistent with knowledge-poor processing are also within the scope of the present invention.

In accordance with embodiments of the present invention, the basis utilized to support a context model as described is any or a combination of, but not necessarily limited to, the following:

1. Identity of the lexical items
2. Identity of surrounding lexical items (context)
3. Capitalization patterns
4. Parts of speech (not knowledge-poor)
5. Length of words
6. Word clustering
7. Punctuation
8. Syntax (not knowledge-poor)
9. Hand written rules (add a human layer)

In accordance with one embodiment, a basis for application of the context model is derived based on an algorithm and processing method disclosed in Yarowsky, D., *Word-sense Disambibuation Using Statistical Models of Roget's Categories Trained On Large Corpora*, In Proc. COLING92, Nantes, France (1992). This reference discloses an algorithm the primary intention of which is to disambiguate words that have semantically different senses (river "bank" versus money "bank"). In one embodiment, a similar algorithm is implemented to distinguish among alternation patterns, thereby enabling a context model for application within the paraphrase system as described herein.

In accordance with block 256 in FIG. 3, it has been determined that if a pattern is suitable to be applied to input 244, the next step is to determine how specifically to apply the pattern. In other words, the boundaries of the text segment that should be modified are determined. Within a system that is not knowledge-poor, information such as parts of speech might support a hypothesis as to the location of boundaries; however, the present knowledge-poor method offers greater cross-domain and cross-linguistic applicability and generality. This being said, boundary detection methods that are not consistent with knowledge-poor processing are also within the scope of the present invention.

In accordance with one embodiment of the present invention, as is indicated by block 256 in FIG. 3, a language model 248 (FIG. 2) is implemented to facilitate the process of applying an applicable pattern to input 244. In one embodiment, language model 248 is trained on an independent large corpus of data that is similar in nature to data 202 (FIG. 2). A different data source, internal or otherwise could be utilized without departing from the scope of the present invention. In accordance with one embodiment, language model 249 is trained on news data (e.g., 3 years of the Wall Street Journal) when clusters 218 are news-oriented.

In accordance with one aspect of the present invention, an applicable pattern is applied in multiple ways to input 244 in order to produce a candidate set of output text segments. Each candidate is compared to language model 248 to determine the most likely candidate based on frequency of occurrence. In this manner, a determination can be made as to how to best apply an applicable pattern to input 244. In accordance with step 258 in FIG. 3, a paraphrase generator 249 receives applicable patterns and appropriately processes input 244 with assistance from context model 246 and language model 248 to produce a paraphrase 251.

An example will now be provided. An input text 244 is illustratively "President George Bush and Senator John Kerry". A determination is made that the patterns above the threshold include an applicable pattern having the following form:

A and B=>B and A

A context model is then applied to facilitate a determination that the input text 244 is similar enough to the data that motivated the pattern to warrant applying the pattern to the input. Next, different textual variations representing different applications of the pattern will different textual boundaries are compared against a language model to determine which variation is the most common. For example, different numbers of words are exchanged from either side of the word "and," which is a pivot point associated with the pattern. Accordingly, the following patterns are checked against the language model:
1. President George Kerry and Senator John Bush
2. President John Bush and Senator George Kerry
3. Senator George Bush and President John Kerry
4. John George Bush and Senator President Kerry
5. President George Senator and Bush John Kerry
6. Kerry George Bush and Senator John President
7. President George John and Senator Bush Kerry
8. President Senator Bush and George John Kerry
9. President Kerry Bush and Senator John George
10. Senator John Bush and President George Kerry
11. President John Kerry and Senator George Bush
12. Senator John Kerry and President George Bush
13. etc.

The comparison against the language model makes it evident that that option #12 is most likely the best choice for application of the pattern because that combination corresponds to the most frequent combination of overlapping text segments (n-grams) as reflected in the data. Finally, option #12 is provided as a meaning preserving paraphrased adaptation of input 244.

It should be noted that any system for generating combinations for comparison to the language model is within the scope of the present invention. The present invention is specifically not limited to exchanging words around a pivot point (e.g., a pivot word or phrase).

There are a wide variety of applications that will benefit from a paraphrase processing system as described herein. For example, the potential applications for paraphrase recognition include a question answering system, as well as more general information retrieval systems. Additionally, such systems can use paraphrase generation capability for a variety of purposes including query expansion (e.g., to produce multiple forms of a single, original query) in order to find better matching results or to improve recall.

Still other applications for the described paraphrase functionality include the summarization of multiple documents. By utilizing paraphrase recognition, an automatic document summarization system can find similar passages in different documents to decide the most salient information in the document set in order to generate a summary.

Another relevant application is a dialog system. Such a system can generate a response that echoes input, but is phrased differently to avoid parroting back the exact same input. This renders the dialog system more natural or conversational sounding.

The technology can also be used in word processing systems. The word processing system can be configured to generate stylistic rewrites automatically, and propose those rewrites to the user. This may be helpful, for instance, where a user is authoring a document and has repeated a phrase a large number of times, perhaps even in a single paragraph. Similarly, a word processing system might include a feature that flags repeated (but differently phrased) information that is spread throughout a document. Similarly, such a system may include a feature that rewrites a piece of prose as a paraphrase.

Embodiments of the present invention can also be implemented in the context of command and control systems. People conventionally ask for things using widely varying terminology. Identifying paraphrases allows such a system to implement the proper command and control actions even if the inputs are phrased in varying ways, and may obviate the need for detailed human scripting.

Although the present invention has been described with reference to particular embodiments, workers skilled in the art will recognize that changes may be made in form and detail without departing from the spirit and scope of the invention.

What is claimed is:

1. A computer-implemented method for determining whether to apply a given paraphrase alternation pattern to an input string, the method comprising: generating a context model based on a data set from which the given paraphrase alternation pattern was derived, the data set being database of news articles; utilizing a computer processor that is a functional component of the computer to apply the context model to determine whether the given paraphrase alternation pattern can be applied to the input string so as to preserve meaning; if it is determined that the given paraphrase alternation pattern can be applied so as to preserve meaning, then applying the given paraphrase alternation pattern to the input string, wherein the given paraphrase alternation pattern indicates a pattern of transformation from a first set of words to a second set of words, and wherein applying the given paraphrase alternation pattern comprises transitioning the input string from the first set of words to the second set of words, and wherein applying the given paraphrase alternation pattern further comprises applying the given paraphrase alternation pattern to the input string in a plurality of different ways to produce a plurality of different textual variations, and then applying the language model to the plurality of different textual variations to determine a probable sequence of words.

2. The method of claim 1, wherein generating a context model based on a data set from which the given paraphrase alternation model was derived comprises generating a context model based on data derived from a database of articles having a related subject matter.

3. The method of claim 1, wherein generating a context model based on a data set from which the given paraphrase alternation pattern was derived comprises generating a context model based on data including aligned sets of phrases containing at least one meaning-preserving alternation.

4. The method of claim 1, wherein generating a context model based on a data set from which the given paraphrase alternation pattern was derived comprises generating a context model based on data including aligned, meaning-related textual segments.

5. The method of claim 1, wherein applying the context model to determine comprises applying the context model to determine whether the input string is contextually consistent with data utilized as a rationale for the given paraphrase alternation pattern.

6. The method of claim 1, wherein applying the context model comprises comparing characteristics of the input string to characteristics of data utilized as a rationale for the given paraphrase alternation pattern.

7. The method of claim 1, wherein generating a context model comprises generating an assumption based on a capitalization pattern.

8. The method of claim 1, wherein generating a context model comprises generating an assumption based on a word length pattern.

9. The method of claim 1, wherein generating a context model comprises generating an assumption based on a word clustering pattern.

10. The method of claim 1, wherein generating a context model comprises generating an assumption based on a punctuation pattern.

11. The method of claim 1, wherein generating a context model comprises generating an assumption based on a syntax pattern.

12. The method of claim 1, wherein generating a context model comprises generating an assumption based on a pattern reflected in a usage of certain parts of speech.

13. The method of claim 1, wherein generating a context model comprises generating an assumption based on a pattern reflected in the identity of lexical components.

14. The method of claim 1, wherein if it is determined further comprises applying only application of the context model indicates that doing so will not create an improbable sequence of words.

15. The method of claim 1, wherein applying a language model comprises applying a language model that incorporates data that reflects a subject matter that is also reflected in data that is utilized as a basis for generation of the given paraphrase alternation pattern.

* * * * *